Patented Sept. 18, 1951

2,568,384

UNITED STATES PATENT OFFICE 2,568,384

STABLE SOLUTION

Nicholas D. Cheronis, Chicago, Ill.

No Drawing. Application November 13, 1947,
Serial No. 785,798

13 Claims. (Cl. 260—33.6)

This invention relates to stable solutions of organic silicon compounds, and more particularly to solutions of partly or partially polymerized condensation products resulting from the dehydration of organosilicon triols and diols in an organic solvent inert towards such compounds.

Important polymerization products are obtained by dehydration of organic silicon compounds of the general formula

where R represents an organic (aliphatic or aromatic) radical, and $n$ represents a figure between 1 and 2. The polymerization products are assumed to have a complex structure; two suggested structures are the open chain type:

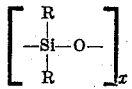

and the type:

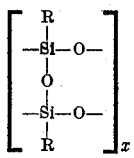

Polymerization, or strictly speaking condensation, takes place by elimination of HOH from the (OH) groups of the silicone monomers or intermediates. In a chain-type silicone polymer, the ratio of Si to O is nearly 1:1, while in a fully cross-linked polymer the Si to O ratio approaches 1:1.5. Organosilicon diols of the type $R_2Si(OH)_2$ as a rule tend to form chain-type polymers, while organosilicon triols of the type $RSi(OH)_3$ polymerize in cross-linked patterns. Generally the cross-linked polymerization patterns are hard and brittle, while the chain-type organosilicon polymers (especially the lower aliphatic substituted ones) are oily liquids provided the molecular weight does not become too high by excessive dehydration.

Polymerization by dehydration of the organosilicones takes place rapidly at elevated temperatures. At room temperature the methyl silicones condense rapidly and the higher homologues less rapidly but nevertheless appreciably. While the triols are particularly advantageous for the formation of water repellent films having desirable characteristics of tensile strength, for the impregnation of papers, textiles and particularly for leather, they suffer from the disadvantage of the great difficulty in obtaining stable hydrolytic products derived to a large extent from organotrihalosilanes which can be kept in solution and in storage for long periods of time. The products obtained by the usual methods are either hard brittle resins or solutions which undergo spontaneous dehydration during storage.

I have discovered that stable solutions of not fully dehydrated hydroxyorganosilanes can be prepared by mixing trihalo-organosilanes and dihalo-diorganosilanes in certain proportions, hydrolyzing them under specified temperature conditions, dissolving the resulting mixture of trihydroxy-organosilanes and dihydroxy organosilanes in a solvent which is inert towards such silanes, and keeping the pH of the solution within specified limits whereby its rate of dehydration is controlled. In these mixtures, the partly condensed dihydroxy-diorganosilane acts as a plasticizer for the partly condensed trihydroxyorganosilane. Such solutions in accordance with my invention keep for a year or longer in bottles or other containers. After removal from storage they yield durable, flexible and non-tacky water-repellent films upon application to a base, evaporation of the solvent and condensation, and curing on such base.

Thus, it is a principal object of my invention to provide a stable solution of a partly dehydrated organosilicon compound, which is capable of being stored for prolonged periods, and which even after such prolonged storage dehydrates to yield a durable, flexible, non-tacky and water-repellent film.

Another principal object of my invention is a stable organosilicon intermediate adapted for impregnating leather, textiles and other bases.

A further important object of my invention is the control of the viscosity of organosilicon intermediates prior to application to a base to be impregnated.

Another object of my invention is the stabilization of the solution of the intermediate polymer so as to prevent gellation, by controlling the pH of said solution.

Another object of my invention is to produce a stable solution of the intermediate silicon polymer which can be emulsified after several months in storage and used for introduction into leather and textiles so as to impart water repellency and other desirable properties.

Still another object of my invention is a simple and safe method of preparing such an intermediate from halogen-substituted organosilicon compounds.

These and other objects and advantages of my invention will more fully appear in the following detailed description of my invention and of several examples of practicing the same.

I have found that it is possible to prepare a mixture of partly dehydrated trihydroxy-organo-silanes $(RSi(OH)_3)$ and partly dehydrated di-organo-substituted dihydroxy-silanes $(R_2Si(OH)_2)$ in a proportion of at least 70% of the former and up to 30% of the latter will refrain from complete spontaneous polymerization for a year or more, if dissolved in a common organic solvent inert towards them. This mixture may be applied to leather, textiles or other bases from its solution, by applying the solution to the base, removing the solvent by exposure to a temperature higher than room temperature and below 100° C and/or in a vacuum, or by permitting the solvent to evaporate by exposure to the air at room temperature. The silicon intermediates remain on the base and cure thereon to form a resilient, nontacky, water-repellent film. The characteristics of the film depend principally on the organic substitution groups of the silicon compound selected, and also on the added plasticizer as will be more fully explained hereafter. With the mixture of intermediaries obtained by partial dehydration of trihydroxy-ethyl silicone and dihydroxy-diethyl silicone in a proportion of over 70% of the former and less than 30% of the latter, a resilient non-tacky and water-repellent film is obtained, particularly in mixture ranges between 90:10 and 98:2. A 90:10 mixture of the corresponding methyl silicon compounds results in a gel; this defect, however, can be cured by increasing the amount of dimethyl silicon compounds to near 30% or by co-depositing an acrylate on the base to be coated or impregnated. The higher homologues of mixtures of trihydroxy alkyl silicones and dihydroxy dialkyl silicones in a proportion of more than 70% of the former to less than 30% of the latter yield, upon curing, films whose hardness increases with the length of the carbon chains. Thus, I find that for coating and impregnating fibrous substances such as textiles, paper, wood, and particularly leather where flexibility and resiliency is essential, the ethyl silicones are most suitable.

In a mixture of aromatic tri- and di-hydroxy-silanes in the above proportions, e. g., a mixture of more than 70% of trihydroxy phenyl silicone in the partly dehydrated state with less than 30% of partly polymerized diphenyl dihydroxy silicone, the resulting film is flexible, resilient and non-tacky upon curing. On the other hand, mixtures of a smaller proportion of a partly dehydrated trihydroxy phenyl silicone and a larger proportion of a partly dehydrated aliphatic di-hydroxy silicone, e. g., dihydroxy diethyl silicone, e. g. a 50:50 mixture as a rule give viscous oils, and not solid films.

The solvent for the silicones must be inert towards them, i. e., must not chemically react with them. Numerous organic solvents are thus suitable, e. g., hexane, heptane or octane, among aliphatic compounds; and benzene, xylene and toluene, among aromatic solvents. Ether by itself, while inert towards the silicones, is not as suitable for the purpose of my invention as the above-named solvents because of its volatile nature; however, in a mixture with less volatile solvents, liquid ethers of the R—O—R and R—O—R₁ type keep the silicones in solution during prolonged storage. A suitable solvent mixture is e. g. 40% ethyl or isopropyl ether and 60% hydrocarbon.

It is important to adjust the silicone mixture in solution to a pH of at least 5 and below 7 by adding thereto an ionizable substance inert towards, that is non-reactive with, the silicones. Solutions whose alkalinity exceeds pH 8 gel even after short periods of storage; thus, a solution with a pH of 10 gels in as little as 24 hours. On the other hand, excessive acidity of the solution has a tendency to result in a non-drying, sticky and tacky film even at curing temperatures of 100° C. and exposure for 24 hours. A pH range between 5.8 and 6.8 is best, and generally speaking, a slightly acidic solution at or near pH 6.5 yields the best films. Suitable acidifying agents for adjusting the pH of my silicone mixture below 7 are, for instance, mineral acids such as hydrochloric and nitric, or acetic acid; while sodium or potassium hydroxide or amines, such as stearyl or other higher amines, are suitable for adjusting the pH of my silicone mixtures on the alkaline side above 7.

Numerous organic silicon triols, i. e., compounds of the type $RSi(OH)_3$, which if dehydrated and cured alone yield a comparatively hard resin, can be plasticized by an admixture of a minor proportion of a polymer of an organic silicon diol, i. e., a compound of the type $R_2Si(OH)_2$. The plasticizing diol itself should have a comparatively short carbon chain or a simple aromatic substitution group; thus, for plasticizing an aliphatic silicon triol, particularly good results are obtained by the use of diethyl-dihydroxy-silane in partly dehydrated form, while for plasticizing an aromatic silicon triol, diphenyl-dihydroxy-silane in partly dehydrated form is suitable.

The average molecular weight of the partly dehydrated silanes contemplated for stable solutions in accordance with my invention has been tentatively determined as between 200 and 5000; the higher the molecular weight, the greater becomes its viscosity. Consequently, a mixture whose average molecular weight is too high becomes unsuitable for the impregnation of fibrous substances, e. g. leather, as excessive viscosity prevents penetration between the fibers of the base and causes a pasty and sticky silicone deposition on the surface of the base. Thus, average molecular weights above 1800 are less suitable than molecular weights between about 500 and about 1800. These molecular weights have been computed by measuring the viscosities of 25% solutions of mixtures of the partly dehydrated tri- and di-hydroxy silicones in toluene and correlating the viscosity data thus found with the viscosity of toluene itself. Viscosity ranges between about 1.2 and about 60 centipoises of such a mixture in solution indicate a stable solution of good keeping qualities, and best results are generally accomplished with solutions whose viscosity is between about 1.5 and about 3.5.

My stable solutions are prepared either by mixing the diols and triols in the specified proportions and dissolving them in the inert solvent, with appropriate pH adjustment; or by hydrolyzing a mixture of organic tri- and di-halosilanes (among which the tri- and di-chlorosilanes are the least expensive) in an ether solution, adjusting the pH of the resulting water layer on the alkaline side (above pH 7), expelling substantially all or part of the ether, adjusting the pH of the residue on the acid side (below pH 7), and dissolving the hydrolyzed organosilanes in an aliphatic or aromatic hydrocarbon solvent. Numerous organic trichlorosilanes can thus be converted into the corresponding trihydroxy-silanes and put up in stable solutions in the presence of hydrolyzed diorgano-substituted dichlorosilanes. Examples of such trichlorosilanes are:

TABLE 1

Methyltrichlorosilane   n-Dodecyltrichlorosilane
Ethyltrichlorosilane    Allyltrichlorosilane
n-Propyltrichlorosilane Phenyltrichlorosilane
Isopropyltrichlorosilane n-Naphthyltrichlorosilane
n-Hexyltrichlorosilane  silane
Isoamyltrichlorosilane  p-Toltyltrichlorosilane
n-Butyltrichlorosilane  p-Anisyltrichlorosilane
Isobutyltrichlorosilane The aliphatic compounds of the foregoing list are plasticized by co-hydrolysis with a dihalosilane, such as dimethyldichlorosilane, diethyldichlorosilane, di - n - propyldichlorosilane, diisopropyldichlorosilane, diphenyldichlorosilane, methyl-phenyldichlorosilane; in aliphatic trihalosilane may be co-hydrolyzed with an aromatic dihalosilane, and vice versa.

The hydrolysis of the chlorosilanes is preferably carried out in an ether system (ethyl ether, isopropyl ether, etc.) and in a cold medium, e. g., by dropping an ether solution of the chlorosilanes (tri- and di-chlorosilanes mixed in proportions from 70:30 to 98:2) upon ice or water at a temperature up to 10° C., separating the ether layer which now contains the corresponding hydrolysis products, removing the ether by distillation or evaporation, and adjusting the pH of the residue. The hydroxy-silanes thus obtained condense, with the addition of a long-chain amine such as stearylamine, to a non-tacky resin film if heated to 60° C., for several hours or if exposed to the atmosphere at room temperature for several days. The hydrolysis products can be converted into stable solutions by dissolving them in a hydrocarbon solvent after expulsion of most or all of the ether solvent. Such solutions contain upwards from 25%, and preferably 40-60% by weight of monomeric or partly polymerized organic hydroxy-silanes.

The above hydrolysis reaction takes place according to the formula:

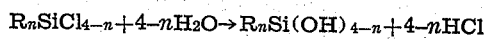

$$R_nSiCl_{4-n} + 4-nH_2O \rightarrow R_nSi(OH)_{4-n} + 4-nHCl$$

The condensation reaction of the thus formed silicone monomers takes place according to the formula:

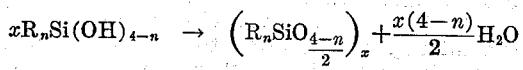

$$xR_nSi(OH)_{4-n} \rightarrow \left(R_nSiO_{\frac{4-n}{2}}\right)_x + \frac{x(4-n)}{2}H_2O$$

The film resulting by the condensation of the silicone intermediates particularly at temperatures below 100° C. depends to a large extent on the following factors:

(a) The molecular pattern of the mixture which in turn depends on the nature of the chlorosilanes used; as the amount of $R_2SiCl_2$ is decreased and $RSiCl_3$ is increased the greater becomes the possibility of cross-linking and hence the greater the hardness of the film.

(b) The initial viscosity of the intermediate polymer; this in turn depends on the extent of the partial condensation which the monomer or mixture of monomers have undergone. For example, starting with a mixture of 90% $C_2H_5SiCl_3$ and 10% $(C_2H_5)_2$ it is possible to obtain a 50% xylene solution of intermediate which is almost as fluid as water or as thick as syrup. If these two silicone intermediate polymers are cast into a film and heated for 24 hours at 60-70° C., the properties of the two are different. The former is oily and very tacky while the latter is stringy and without extensive tackiness. For textiles and leather it is important to control the nature of the film since they cannot be heated to high temperatures as ceramics, metals and the like.

(c) Finally the properties of the film resulting from the dehydration of silicones depend on rate of which this hydration or polymerization or condensation takes place. For example, it is known that the dehydration takes place much easier at 150° C. than 100° C. However, with fibrous materials it is desirable to accelerate as far as possible the rate of curing which is assumed to be essentially dehydration, since these materials cannot be heated at high temperatures.

I have discovered that given any intermediate silicon polymer resulting from the hydrolysis of a halosilane $RSiX_3$ or mixtures of $RSiX_3$ and $R_2SiX_2$, wherein R is a monovalent hydrocarbon or anisyl group, which has a definite viscosity and a definite rate of curing (or dehydration) at temperatures below 100° C., that first I can increase the viscosity to almost the gel point and still be able to keep the intermediate for a long time at this new viscosity. Second, I can accelerate the rate of curing at temperatures below 100° C. as determined by the change of an oily, sticky film to a resinous and non-tacky film.

The change in viscosity of a silicon intermediate polymer is brought about rapidly by stirring its concentrated hydrocarbon solution with an alkaline solution. Sodium hydroxide, potassium hydroxide and the like in strengths from 1 N to 6 N work well. The same result may be accomplished more slowly by allowing the solution to stand over a weak alkaline solution. Since pH is the basis for this change it has been found that the ethereal extract from the hydrolysis of the halosilanes may be adjusted to either acid or alkaline pH and thereby obtain silicon intermediates of varying viscosities. For example, in one experiment a mixture of 3600 grams of $C_2H_5SiCl_3$ and 400 grams of $(C_2H_5)_2SiCl_2$ dissolved in 700 ml. of ether was hydrolysed. The mixture was neutralized, the ether was separated and divided into two portions. One was kept at pH 5.0 and the other at pH 10. After 24 hours both were dried with calcium chloride and then after addition of a liter of xylene to each the ether was removed by distillation under identical conditions. Each portion was concentrated to 1800 grams of solution containing 50% of intermediate silicone. The sample kept at pH 5.0 for 24 hours when diluted to 25% solids gave a viscosity of 1.80 centipoises and on evaporation gave a very oily tacky film. The sample kept at pH 10 for 24 hours when diluted to 25% solids had a viscosity of 4.40 centipoises and gave on evaporation a very thick, stringy—almost non-tacky resin.

By mixing a solution having a low viscosity and one having a high viscosity in various proportions it is possible to obtain any desirable viscosity. It has been found that for certain types of glove leather the most desirable film is one which is obtained from silicone solution which has a viscosity of 1.50 and 3.50 centipoises for a 25% xylene solution measured at 25° C.

The acceleration of curing is brought about by change in pH while the film is being deposited. For example, if a solution of silicone intermediate in a hydrocarbon placed in a stoppered bottle is treated with a base such as potassium hydroxide pellets, sodium hydroxide pellets or addition of an amine such as diethylamine, triethylamine, n-proplyamine, or ammonia, so that the concentration of the base is 5% in the total, a thickening takes place within 24 hours and the intermediate changes to a gel within 2 to 5 days at room temperature. This definitely proves that change to alkaline pH accelerates the dehydration of the silicones and hence it speeds up the curing. Though the addition of strong bases may be used to cure silicone films used as paint it is desirable for leather and textiles and other fibrous materials to use a higher alkylamine such as decyl, dodecyl, hexadecyl or octadecylamine. In addition to their being non-volatile these amines in small quantities are non-toxic and water repellent. The curing effect is shown if films of a low viscosity silicone is cast upon glass slides. In a series of experiments the films containing 0.8 to 1% of the higher alkylamine (based upon the solids) are cured and non-tacky within 24 hours at room temperature while those with no addition of the amine remain tacky for 3 weeks longer.

The following examples illustrate in detail specific methods of preparing stable solutions in accordance with my invention:

*Example I*

Ninety (90) parts by weight of ethyl trichlorosilane and 10 parts by weight of diethyl dichlorosilane are dissolved in 150 parts of ethyl ether, and then added slowly, with stirring, to 200 parts of ice. The mixture now is treated with 35 parts of calcium hydroxide and then with 7 parts sodium carbonate until the hydrochloric acid, which is generated by the hydrolysis reaction, has been neutralized. The same objective may be attained by using a 30% solution of commercial sodium hydroxide. The ether layer is separated from the aqueous layer and after the pH is adjusted to about 6.5 to 7.0 it is dried with anhydrous calcium chloride. The ethereal solution is transferred into a distilling flask and about two-thirds of the ether is distilled off. To the remaining solution are now added about 50–60 parts of a hydrocarbon solvent, e. g., hexane, octane, toluene, xylene, and the residual ether is distilled off under reduced pressure between 60° and 80° C. This operation takes about 0.5 to 1 hour. The resulting hydrocarbon solution contains from 50–55% solid of a 90–10 mixture of ethyl silicon triol and diethyl silicon diol, in partly polymerized form. The amount of solids present is determined by weighing a sample of the solution and then heating at 60–70° C. for 48 hours or bringing to constant weight, and then weighing the residue. The solution is adjusted to about pH 6.0–6.5 and then stored in dark bottles. The solution remains stable for periods of more than a year provided the pH is kept below 7.0.

*Example II*

Thirty-six hundred (3600) grams of ethyl trichlorosilane and 400 grams of diethyl dichlorosilane are dissolved in 7000 ml. of ethyl ether and 1000 ml. of xylene, and are slowly introduced at a rate of 160 ml. per minute into a 10-gallon stainless steel drum packed in an ice-salt mixture and containing 4000 grams of crushed ice. At this rate of addition, hydrolysis of the chlorosilanes takes place at a temperature of 0° C. or less. Where necessary, the temperature can be adjusted by adding additional crushed ice directly with the dissolved silanes. The contents of the drum are constantly stirred during the mixing and about 5 minutes thereafter, to insure complete hydrolysis. At this stage of the process, temperature adjustment may also be effected by adding more crushed ice.

About 6400 grams of 50% aqueous solution of sodium hydroxide are gradually added to the aqueous phase inside the drum to effect the neutralization of the hydrochloric acid produced by the hydrolysis of the halosilanes. Rate of addition of the sodium hydroxide is preferably about 100 grams per minute, as a more rapid addition would result in an undesired rise of temperature above 10° C. Substantial neutralization of the aqueous phase is effected when the pH is adjusted to between 6.5 and 7.0 (preferably the former), and at any rate not above 7.0.

The neutralized aqueous phase is then washed successively with two 1000 ml. portions of ethyl ether to recover the silicones contained therein. These two ether washings are combined with the original ether phase and the whole is dried over 200–300 grams of powdered calcium chloride for a period of 16 hours.

The solution is now subjected to distillation to remove about 5000 ml. of ether. At this point is added 1000 ml. of xylene, and the solution is concentrated at a reduced pressure and a temperature of 50° C. until the distillation stops. The resulting concentrated solution contains about 50% of dissolved silicones. It has the same keeping qualities as the solution produced in the preceding example, provided the pH is kept below 7.0.

*Example III*

The following examples illustrate the increase in viscosity of a solution of a silicone intermediate polymer:

Four thousand (4000 grams) of a solution of 1970 grams of a silicone intermediate in 2030 grams of xylene, obtained by the hydrolysis of 3600 grams of ethyl trichlorosilane, as described in Example II was placed in a 5 liter round bottom flask. The viscosity of the intermediate was 1.75 centipoises for a 25% solution at 20° C. The solids as determined by evaporation of a sample of the solution at 70° C. for 48 hours was 49.2 per cent by weight. To this solution was added 300 ml. of 3 N solution of sodium hydroxide and the mixture stirred by a mechanical stirrer. After about 0.5 hour from the beginning of stirring the two phases initially present disappeared and a milky dispersion resulted which became more viscous with continued stirring. After 5 hours the stirring was discontinued and the mixture was allowed to separate. To aid separation 500 ml. of ether was added. The aqueous layer was separated by means of a separatory layer and the ether-xylene solution was brought to pH 6.0 by means of hydrochloric acid and placed in a stoppered flask with 200 grams of calcium chloride and allowed to stand overnight. The dry xylene-ether solution was filtered to remove the calcium chloride and then the ether removed at 30–40° C. under reduced pressure. When all the ether was removed the xylene solution was placed in a bottle. The yield was 2700 grams of solution containing 51.5% solids. The viscosity of a 25% xylene solution was found to be 4.30 centipoises, an increase of 2.55 centipoises from the original solution. The film from this solution is resilient and non-tacky.

*Example V*

Thirty-eight hundred (3800) grams of a solution of 1900 grams of a silicone intermediate in 1900 grams of xylene, obtained by the hydrolysis of 3420 grams of ethyl trichlorosilane, as described in Example 2, was placed in a 5 liter round bottom flask. The viscosity of the intermediate was 2.05 centipoises for a 25% solution at 20° C. The solids as determined by evaporation of a sample of the solution at 65°-70° C. for 48 hours was 50.01%. To this solution was added 280 ml. of 3 N sodium hydroxide solution and the mixture was stirred by a mechanical stirrer for 6 hours. The milky mixture was allowed to stand for 15 hours; at the end of this period the mixture had not completely separated. To aid in the separation and to break the emulsion, 500 ml. of ether and 200 ml. of methanol were added and the two phases separated. The aqueous layer was withdrawn and the xylene-ether solution was adjusted to pH 6.0 and filtered to remove the small amount of silicone that had gelled. To the solution was added 200 grams of anhydrous calcium chloride and allowed to stand for 6 hours. It was then distilled as described in the preceding example. The yield was 3650 grams of solution containing 50.2 per cent of solids. The viscosity of a 25% xylene solution was found to be 15.35 centipoises at 20° C., an increase of 13.30 centipoises. When a sample of this solution was heated for 24 hours at 60-65° C. a tough non-tacky and not brittle film was obtained.

Fluoro-, bromo- and iodo-substituted organosilanes may be substituted for the chlorosilanes mentioned in the foregoing examples as suitable for hydrolysis.

It will also be understood that the terms "dehydration" and "condensation" and the terms "dehydrate" and "condense" are used synonymously throughout the specification and claims. The term "partially dehydrated" silicon compound is meant to refer to such compounds of the class described as are soluble in a hydrocarbon or ether solvent.

The stable solutions prepared in accordance with the foregoing examples or analogous methods are applied to fibrous materials such as leather, textiles (cotton, wool, silk, nylon, etc.), wood, fur, or non-fibrous articles such as metal or glass, by direct application and evaporation of the hydrocarbon solvent. This results in the formation of a tough and flexible film. In the case of textiles, application is preferably effected by padding.

In application to leather, favorable results are obtained by first emulsifying the solution (or dispersing the solute) in water with the addition of suitable emulsifying agents such as tannery soap, lauryl sulfate, the oleyl ester of sodium tauride or of sodium methyl-tauride (now sold under the trade name of "Igepon-T"), a sodium sulfonate of a higher aliphatic aromatic alcohol (now sold under the trade name of "Nacconal") carried out in a colloid mill. I have found that the resiliency of the film formed on the leather is further improved by adding to the silanol solution or emulsion prior to its application to leather up to 20%, preferably 5-7%, of a suitable plasticizer, such as a phthalate, tricresyl phosphate, castor oil, or paraffin oil. The impregnated leather is non-tacky, extremely pliable, and possesses water repellency over a prolonged period of time. It is particularly suitable for gloves and shoe uppers, as it does not crack even upon frequent flexing over prolonged periods.

The following example illustrates a method of impregnating leather from an emulsion:

Example V

An emulsion is prepared by emulsifying in a colloid mill at about 12,000 R. P. M.: 700 gms. of a solution in xylol of 315 gms. of partly polymerized ethyl trihydroxysilane and 35 gms. of partly polymerized di-ethyl dihydroxysilane (average molecular weight of polymers about 1000, by viscosimetric determination), prepared according to Example II, 20 gms. tricresyl phosphate (a plasticizer), 10 gms. sulfated neat's-foot oil (an emulsifying agent), 5 gms. Tergitol (a wetting and emulsifying sodium salt of a higher alkyl sulfate), and 700 cc. water.

The emulsion is heated to about 130° F., diluted with 1000 cc. of water of the same temperature, and poured into a small leather tumbling mill. A side of leather, weighing 900 gms., is first thoroughly wetted with water, and then placed in the mill and tumbled for 30 minutes. After 15 minutes the liquor in the mill is substantially completely "exhausted," i. e., substantially all silicone compounds have left it (this can be determined by analytic determination of its Si contents) and gone into the leather. The leather is removed from the mill and dried for about 48 hours (preferably at high humidity for the first 24 hours at or somewhat above room temperature in a highly humid atmosphere, and the next 24 hours in a dry atmosphere) and staked as usual. During drying, the xylene evaporates and the silicones, deposited almost uniformly in the leather, polymerize and cure. The weight of the treated leather is about 1245 gms.; the add-on of 345 gms. indicated that almost 100% of the silicones have gone from the emulsion into the leather. The treated leather possesses increased strength, great suppleness and flexibility, and is water repellent and air- and vapor-permeable. Such properties, ordinarily possessed only by high-grade and expensive glove leather, can be imparted by my above treatment to poor and medium grade leather. Even belly leather is greatly improved by such treatment. The amount of "add-on" can be controlled by increasing or decreasing the amount of silicones in the treating liquor. In general, the poorer grades of leather require a comparatively great "add-on"; ordinarily an "add-on" between 15 and 40% produces the desired results.

For the introduction of silicone films to textiles the same general method is followed in the preparation of emulsions although the composition is varied slightly. The method of introducing the emulsion within the textile fibers is different since it depends on dipping, and roll-squeezing rather than tumbling in a mill as in the introduction to leather.

Example VI

Eight hundred (800) grams of a stable silicone solution, prepared according to Example I, containing 50% solids and the rest xylene, having a viscosity of 1.7 centipoises was mixed with 600 grams of xylol in which the following materials had been previously dispersed or dissolved: tricresyl phosphate 0.6 gram; castor oil 0.6 gram, stearylamine (curing agent for silicones) 1.2 grams, neat's-foot oil sulfated 4 grams and Permasol Base (Houghton) 40 grams. The latter can be substituted by any of the commercially available wetting agents. This mixture was emulsified with 996 grams of water by passing through a colloid mill at 10,000 to 12,000 R. P. M., giving a total of 2040 grams of a stable emulsion and containing about 20.0% of non-volatile and non-washable solids. The emulsion can be diluted to 10% solids or 5% solids depending on the amount of film that one wishes.

Pieces of nylon cloth 3 ounce, cotton duck 8 ounce, balloon cloth and cotton sheeting approximately 10x12 inches were dipped twice for one minute in the emulsion, then squeeze-rolled each time so as to force the emulsion throughout the fibers, then drained and hung to dry first for 3 hours at 20° C. and then at 55-60° C. for 8 hours. The samples were then allowed to stand at room temperature before weighing. The table below shows that the gain in weight by each sample depends on the solids of the emulsion:

TABLE 2

| Sample | Weight Before Treatment | Per cent of Solids in the Emulsion | Weight after treatment and curing | Per cent Gain |
| --- | --- | --- | --- | --- |
| Nylon, 3 oz | 7.487 | 20 | 8.615 | 15.1 |
| Duck, 8 oz | 33.645 | 20 | 41.067 | 22.0 |
| Cotton Sheeting | 9.653 | 20 | 11.527 | 19.4 |
| Balloon Cloth | 6.835 | 20 | 9.036 | 22.0 |
| Nylon, 3 oz | 7.587 | 10 | 8.327 | 9.7 |
| Duck, 8 oz | 34.242 | 10 | 37.908 | 10.7 |
| Balloon Cloth | 7.210 | 10 | 7.905 | 9.7 |
| Cotton Sheeting | 9.970 | 10 | 10.010 | 10.5 |

All the samples were flexible without any tackiness and possessed excellent water repellent properties.

Having thus fully described my invention, I desire it to be understood that I intend to claim the same broadly and to limit its scope only by the appended claims.

I claim:

1. A solution stable on prolonged storage and capable of depositing a flexible resin at a curing temperature below 100° C. after prolonged storage, comprising from 70 to 98% of a partly polymerized trihydroxy-organosilane and the remainder substantially all a partly polymerized dihydroxy-diorganosilane, in an organic solvent for said silanes and inert toward said silanes, said solution having a pH of at least 5 and below 7, the organic substituents of said silanes being selected from the group consisting of monovalent hydrocarbon and anisyl.

2. A solution stable on prolonged storage and capable of depositing a flexible resin at a curing temperature below 100° C. after prolonged storage, comprising between about 90% and about 98% of partly polymerized trihydroxy-ethylsilane and the remainder substantially all partly polymerized dihydroxy-diethylsilane, in an organic solvent for said silanes and inert towards said silanes, said solution having a pH of at least 5 and below 7.

3. A stable solution according to claim 1, wherein said solvent comprises a hydrocarbon.

4. A stable solution according to claim 1, wherein said partly polymerized silanes have an average molecular weight of at least 200 and not exceeding 5000.

5. A stable solution according to claim 1, wherein said partly polymerized silanes have an average molecular weight between about 500 and about 1800.

6. A stable solution according to claim 1, whose viscosity in a 25% solution in xylene is between 1.2 and 60 centipoises.

7. A stable solution according to claim 1, whose viscosity in a 25% solution in xylene is between 1.5 and 3.5 centipoises.

8. A mixture stable on prolonged storage and capable of depositing a flexible resin at a curing temperature below 100° C. after prolonged storage, comprising about 90% of partly polymerized ethyltrihydroxysilane and the remainder substantially all partly polymerized diethyldihydroxysilane, dissolved in xylene, the amount of dissolved silanes being between 40% and 60%, said mixture having a viscosity in a 25% solution at 20° C. of 1.2 to 60 centipoises and a pH of 5.8.

9. Method for preparing a solution of organosilanols stable on prolonged storage and capable of depositing a flexible resin at a curing temperature below 100° C. after prolonged storage, comprising adding to a substance being a member of the group consisting of ice and water at a temperature not exceeding 10° C. a mixture of from 70 to 98% of a trihalo-organosilane and the remainder substantially all a dihalo-diorganosilane in an organic solvent for said silanes and inert towards said silanes, the organic substituents of said silanes being selected from the group consisting of monovalent hydrocarbon and anisyl, adjusting the pH of the solvent layer to at least 5 and below 7, and separating the water layer.

10. Method for preparing a solution of organosilanols stable on prolonged storage and capable of depositing a flexible resin at a curing temperature below 100° C. after prolonged storage, comprising adding to a substance being a member of the group consisting of ice and water at a temperature not exceeding 10° C. a mixture of from 70 to 98% of a trihalo-organosilane and the remainder substantially all a dihalo-diorganosilane in an organic solvent for said silanes and inert towards said silanes, the organic substituents of said silanes being selected from the group consisting of monovalent hydrocarbon and anisyl, adjusting the pH of the system to at least 5 and below 7, separating the water layer, partly removing said solvent, and adding a hydrocarbon solvent for said hydrolyzed organosilanols.

11. Method for preparing a solution of organosilanols stable on prolonged storage and capable of depositing a flexible resin at a curing temperature below 100° C. after prolonged storage, comprising adding to a substance being a member of the group consisting of ice and water at a temperature not exceeding 10° C. a mixture of from 70 to 98% of a trihalo-organosilane and the remainder substantially all a dihalo-diorganosilane in an organic solvent for said silanes and inert towards said silanes, the organic substituents of said silanes being selected from the group consisting of monovalent hydrocarbon and anisyl, adjusting the pH of the system to at least 5 and below 7, separating the water layer, partly removing said solvent until said solution is concentrated to contain at least 25% of organosilanols, and adding a hydrocarbon solvent for said hydrolyzed organosilanols.

12. A method for preparing a solution of organosilanes stable on prolonged storage and capable of depositing a flexible resin at a curing temperature below 100° C. after prolonged storage, comprising hydrolyzing a mixture of from 70 to 98% of a trihalo-organosilane and the remainder substantially all a dihalo-diorganosilane at a temperature not exceeding 10° C. in the presence of an organic solvent inert towards said organosilanes, the organic substituents of said organosilanes being selected from the group consisting of monovalent hydrocarbon and anisyl, adjusting the pH of the hydrolyzed solution to above 7, maintaining said solution at such alkaline pH until a sample of said solution concentrated to 25% of organosilanols has a viscosity of at least 1.2 centipoises, adjusting the pH of said solution to at least 5 and below 7, concentrating said solution to contain at least 25% of organosilanols, removing moisture therefrom, and adding a hydrocarbon solvent for said organosilanols.

13. A method for increasing the viscosity of a solution of the hydrolysis products of a mixture containing from 70 to 98% of a trihalo-organosilane and the remainder substantially all a dihalo-diorganosilane, said solution being stable on prolonged storage and capable of depositing a flexible resin at a curing temperature below 100° C. after prolonged storage, the organic substituents of said silanes being selected from the group consisting of monovalent hydrocarbon and anisyl, said method comprising stirring a concentrated solution of said hydrolysis products in a solvent inert towards said hydrolysis products with a base until a sample of said solution concentrated to 25% of organosilanols has a viscosity of at least 1.2 centipoises, separating said base, adjusting the pH of said solution to at least 5 and below 7, and removing moisture therefrom.

NICHOLAS D. CHERONIS.

REFERENCES CITED

The following references are of record in the file of this patent:

UNITED STATES PATENTS

| Number | Name | Date |
| --- | --- | --- |
| 2,437,204 | McGregor et al. | Mar. 2, 1948 |
| 2,470,479 | Ferguson et al. | May 17, 1949 |
| 2,470,497 | Lamoreaux | May 17, 1949 |

FOREIGN PATENTS

| Number | Country | Date |
| --- | --- | --- |
| 542,655 | Great Britain | Jan. 21, 1942 |